(12) United States Patent
Muraoka et al.

(10) Patent No.: US 8,509,696 B2
(45) Date of Patent: Aug. 13, 2013

(54) RADIO APPARATUS, RADIO COMMUNICATION SYSTEM, AND METHOD FOR DETECTING RADIO WAVE

(75) Inventors: Kazushi Muraoka, Tokyo (JP); Masayuki Ariyoshi, Tokyo (JP); Takeo Fujii, Tokyo (JP)

(73) Assignees: NEC Corporation, Tokyo (JP); The University of Electro-Communications, Tokyo (JP)

( * ) Notice: Subject to any disclaimer, the term of this patent is extended or adjusted under 35 U.S.C. 154(b) by 263 days.

(21) Appl. No.: 12/810,656

(22) PCT Filed: Dec. 12, 2008

(86) PCT No.: PCT/JP2008/073130
§ 371 (c)(1),
(2), (4) Date: Jun. 25, 2010

(87) PCT Pub. No.: WO2009/084463
PCT Pub. Date: Jul. 9, 2009

(65) Prior Publication Data
US 2010/0279725 A1 Nov. 4, 2010

(30) Foreign Application Priority Data
Dec. 28, 2007 (JP) ................................. 2007-341376
Apr. 15, 2008 (JP) ................................. 2008-105473

(51) Int. Cl.
*H04B 15/00* (2006.01)
(52) U.S. Cl.
USPC ........................ 455/62; 455/63.1; 455/67.11

(58) Field of Classification Search
USPC .............. 455/73, 550.1, 509, 450, 452.1, 45, 455/100, 62; 370/338, 437, 450, 319, 351, 370/329, 328, 342, 462, 310; 375/137, 344, 375/267, 260, 347
See application file for complete search history.

(56) References Cited

U.S. PATENT DOCUMENTS

| | | | | |
|---|---|---|---|---|
| 7,949,357 | B2 * | 5/2011 | Huttunen et al. | 455/509 |
| 8,055,213 | B2 * | 11/2011 | Hui et al. | 455/100 |
| 2003/0013480 | A1 * | 1/2003 | Endo | 455/552 |
| 2003/0219002 | A1 | 11/2003 | Kishida | |
| 2007/0042733 | A1 | 2/2007 | Tomioka | |

(Continued)

FOREIGN PATENT DOCUMENTS

| | | |
|---|---|---|
| CN | 101167399 | 4/2008 |
| JP | 2002-009712 | 1/2002 |
| JP | 2003-249973 | 9/2003 |
| JP | 2007-053546 | 3/2007 |
| JP | 2007-088940 | 4/2007 |
| WO | WO2007-096819 | 8/2007 |

OTHER PUBLICATIONS

International Search Report, PCT/JP2008/073130, Feb. 3, 2009.
Cabric et al. "Implementation Issues in Spectrum Sensing for Cognitive Radios", pp. 772-776, Berkeley Wireless Research Center, University of California, Berkeley.
Chinese Office Action issued Aug. 2, 2012 by the Chinese Patent Office in corresponding Chinese Patent Application No. 200880123222.5, 7 pages.

*Primary Examiner* — Edward Urban
*Assistant Examiner* — Golam Sorowar
(74) *Attorney, Agent, or Firm* — Young & Thompson

(57) ABSTRACT

Provided is a radio communication system including a plurality of cognitive radio apparatuses each including at least: a transmission/reception element; and a detection element for detecting a radio wave transmitted from a radio apparatus of another radio communication system, in which the radio communication system further includes a control section for determining a frequency band on which each cognitive radio apparatus of a radio apparatus group including the plurality of cognitive radio apparatuses is to detect the radio wave.

10 Claims, 12 Drawing Sheets

(56) References Cited

U.S. PATENT DOCUMENTS

| | | |
|---|---|---|
| 2007/0253394 A1* | 11/2007 | Horiguchi et al. ............ 370/338 |
| 2008/0057996 A1* | 3/2008 | Sung et al. .................... 455/522 |
| 2008/0096600 A1* | 4/2008 | Siegel ........................... 455/519 |
| 2008/0155249 A1* | 6/2008 | Backof et al. ................. 713/100 |
| 2008/0161035 A1* | 7/2008 | Tomioka et al. ........... 455/550.1 |
| 2009/0280749 A1 | 11/2009 | Tanno et al. |

* cited by examiner

RADIO APPARATUS, RADIO COMMUNICATION SYSTEM, AND METHOD FOR DETECTING RADIO WAVE

TECHNICAL FIELD

This invention relates to a radio apparatus and a radio communication system for cognizing a surrounding radio environment to define a frequency band to be used.

BACKGROUND ART

In cognitive radio, which corresponds to a radio communication system in which parameters to be used for radio communication are adaptively changed according to a surrounding radio environment, a surrounding radio environment is cognized (radio signals are detected) and parameters are optimized according to the radio environment. In particular, as a secondary system, a cognitive radio communication system shares and uses a frequency band that is allocated to another radio communication system (hereinafter, referred to as primary system), to thereby improve efficiency of the frequency band usage.

In sharing a frequency band between the primary system and the secondary system, it is necessary to protect the primary system preferentially. Accordingly, the primary system may preferentially use a frequency band that is allocated thereto in advance. Further, in order to avoid interference with the primary system, the secondary system is required to use a frequency band that is not used by the primary system, or to perform communication so that its interference amount is equal to or smaller than an interference amount allowed by the primary system. In other words, the secondary system needs to correctly recognize, before the use of the frequency band, a status of the band usage of the primary system.

Methods of recognizing the status of the frequency band usage by the secondary system may be classified into two main types.

One type corresponds to a method in which a radio apparatus of the secondary system detects, before starting communication, a frequency band that is being used by the primary system in a candidate frequency band to be used by the secondary system. The other type corresponds to a method in which the secondary system detects that the primary system has started communication in a frequency band that is being used by the secondary system. In this case, the secondary system stops using the frequency band and performs communication using another available frequency band.

As a specific method of detecting a frequency band used by the primary system (frequency band that the secondary system intends to use), there is spectrum sensing as means for the secondary system radio apparatus (cognitive radio apparatus) to detect a radio signal in its surrounding. Spectrum sensing mainly includes a method based on power detection in which determination is made based on a magnitude of a received signal power determined based on a time average, and a method in which a feature amount contained in a transmitted signal of the primary system is used for detection. As the method using a feature amount of the signal, there are provided a method using cyclostationarity contained in the transmitted signal of the primary system, and a method in which the secondary system radio apparatus prepares the same signal sequence as a pilot signal sequence contained in the received signal to correlate the signal sequence to the received signal sequence. Those technologies are described in, for example, Non-patent Document 1 and Patent Document 1.

Patent Document 1 describes a cognitive communication system including radio channel detection means for detecting whether or not a radio channel (radio band) that is allocated to another radio apparatus (primary system) is free. In the cognitive communication system, when a radio channel is detected and turns out to be free (when the primary system is not using the radio channel), an effective period is set, and the expiration of the effective period triggers a radio base station to instruct a radio terminal of the cognitive communication system to detect a frequency band with the expired effective period, to thereby recheck the free state of the radio channel. Further, the document describes a spectrum sensing technology in which a received signal is analyzed to identify a frequency characteristic, an amplitude characteristic, an access scheme, a modulation scheme, and the like.

It should be noted that the spectrum sensing performed by each individual secondary system radio apparatus as described in Patent Document 1 is difficult in reliable detection of the primary system due to influences of a surrounding radio propagation environment, including fading, shadowing, distance attenuation, and frequency correlation. In addition, the spectrum sensing is highly influenced from detection accuracy due to each individual secondary system radio apparatus, failure in detection, and the like.

Next, with reference to FIG. 1, description is given of a concept of cooperative sensing performed by a plurality of radio apparatus of the secondary system. In FIG. 1, there are provided a primary system radio apparatus 100 for transmission and a primary system radio apparatus 110 for reception, which are existing radio apparatus, and secondary system radio apparatus 200 to 230 included in a group (radio apparatus group) including the whole or part of radio apparatus of the secondary system that may use the same communication scheme. FIG. 1 exemplifies a group (radio apparatus group) including four secondary system radio apparatus. One of the secondary system radio apparatus included in the group is classified into a master node 200, and the others are classified into slave nodes 210, 220, and 230. It should be noted that the slave nodes 210, 220, and 230 may have the same configuration as that of the master node, or may have a configuration different therefrom.

Here, the master node 200 and the slave nodes 210, 220, and 230 that are included in the group individually detect a primary system. As a spectrum sensing method to be used for the detection, the method described in Non-patent Document 1 and Patent Document 1 or other such method may be employed with no particular limitation.

The slave nodes each perform detection and then transmit detection information to the master node 200. The master node 200 uses the detection information on the used frequency band, which is received from each of the slave nodes, and detection information obtained through detection performed by the master node 200 itself, to thereby determine whether or not the frequency band on which the detection has been performed is being used by the primary system. The master node 200 notifies the slave nodes of an available frequency band.

As described above, in the cooperative sensing, any method may be used as the spectrum sensing method individually performed by each secondary system radio apparatus. However, as compared with the spectrum sensing based on power detection, the spectrum sensing using a feature amount, such as the method using a correlation with a pilot signal, is higher in accuracy of detection of the primary system, but longer in processing time. Hence, it is not preferred that the spectrum sensing using a feature amount be applied to all channels included in a wide frequency band. Therefore, there is a demand for a technology that enables efficient detection on all channels included in a wide frequency band.

Patent Document 2 describes an example of the technology of performing detection on the above-mentioned wide frequency band. Patent Document 2 describes a method in which two kinds of waiting times different in length are prepared in a channel that is being used by the secondary system, and detection of the primary system is performed at separate two stages. In this method, there are provided, in a predetermined cycle, one or a plurality of short waiting times used in detection at a first stage, and one long waiting time used in detection at a second stage. The short waiting time is associated with each channel, and each secondary system radio apparatus performs, on the channel associated thereto, sensing using spectrum sensing that requires a shorter period of time and has a smaller processing amount, such as the above-mentioned power detection. Based on results obtained therethrough, the secondary system radio apparatus omits the detection at the second stage on channels having sufficiently low possibility of use by the primary system. For example, the detection at the second stage is omitted for channels having power values obtained through the power detection constantly below a predetermined threshold, and other such channels. Next, during the long waiting time, the secondary system radio apparatus performs detection of the primary system with higher accuracy only on the remaining channels by means of the above-mentioned spectrum sensing using a feature amount.

With the above-mentioned method, the spectrum sensing such as the power detection that is shorter in processing time is used at the first stage, to thereby narrow down in advance channels on which the spectrum sensing using a feature amount is to be performed, which results in the shorter processing time.

Patent Document 1: JP 2007-88940 A
Patent Document 2: WO 2007/096819
Non-patent Document 1: D Cabric, S. M. Mishra, and R. W. Brodersen, "Implementation issues in spectrum sensing for cognitive radios," Proc of the Thirty-Eighth Asilomar Conference on Signals, Systems and Computers (November 2004)

DISCLOSURE OF THE INVENTION

Problem to be Solved by the Invention

Next, for the sake of the clearness of the description, with reference to FIGS. 2A and 2B, description is given of an example in which eight secondary system radio apparatus detect radio signals of the primary system on the same frequency band.

In FIG. 2A, the axis of abscissa represents a frequency while the axis of ordinate represents power, and signals of the primary system are illustrated as signals 301, 302, and 303. The signals of the primary system are each a signal of a frequency band that is allocated to each TV station or radio station, for example. Further, the frequency bands (channels) with no signal indicate that the frequency bands are not being used by the primary system. In the example of FIG. 2A, channels to be used by the secondary system are divided into eight channels of ch1 to ch8.

In FIG. 2B, the axis of abscissa represents a frequency while the axis of ordinate represents a first radio apparatus to an eighth radio apparatus of the secondary system, which correspond to #1 to #8, respectively. Further, areas surrounded by dotted lines represent frequency bands on which the respective secondary system radio apparatus performs the detection, and are segmented by vertical dotted lines for the respective channels. Each radio apparatus of the secondary system detects, in sequence from ch1 to ch8, whether or not the primary system is using the channels.

Symbols "○" and "×" of FIGS. each represent a detection result of each channel obtained by the secondary system radio apparatus. The symbol "○" indicates that "the primary system is not using the band" whereas the symbol "×" indicates that "the primary system is using the band". In the example of FIG. 2B, the primary system is using frequency bands relating to three channels of ch1, ch5, and ch8 as illustrated in FIG. 2A, and detection results of the detection performed by the first radio apparatus to the eighth radio apparatus of the secondary system show "×", respectively.

It should be noted that in FIG. 2B, all the eight secondary system radio apparatus included in the group are denoted by a node number "#n" with no distinction between the master node and the slave node. Such a notation is commonly applied to FIGS. 9, 10, 11, 12, 13, 14, 15, 17, 18, and 19.

As described above, when each radio apparatus of the secondary system performs detection on all the frequency bands (channels) sequentially, a large amount of resources are necessary, which is not efficient.

This invention has been made in view of the above-mentioned problem, and it is therefore an object of this invention to provide a radio communication system capable of detecting another radio communication system with high efficiency.

Means to Solve the Problem

A radio communication system according to this invention includes a plurality of cognitive radio apparatuses each including at least: a transmission/reception section; and a detection section for detecting a radio wave transmitted from a radio apparatus of another radio communication system, the radio communication system further comprising a control section for determining a frequency band which is to be assign to each cognitive radio apparatus of a radio apparatus group including the plurality of cognitive radio apparatuses, and which serves to detect the radio wave.

Effect of the Invention

According to this invention, it is possible to provide the radio communication system capable of detecting another radio communication system with high efficiency.

BEST MODE FOR EMBODYING THE INVENTION

With reference to FIGS. 3 to 16, description is given of a first embodiment of this invention.

This embodiment is characterized in that a master node specifies, for a plurality of slave nodes, frequency bands on which detection of a primary system is to be performed, and a master node 500 collects and analyzes detection results, to thereby enable effective detection of the primary system. A radio apparatus group including the master node and the slave nodes that perform detection of the primary system in response to the specification from the master node is hereinafter referred to as a cooperative group for description.

Figure 1:
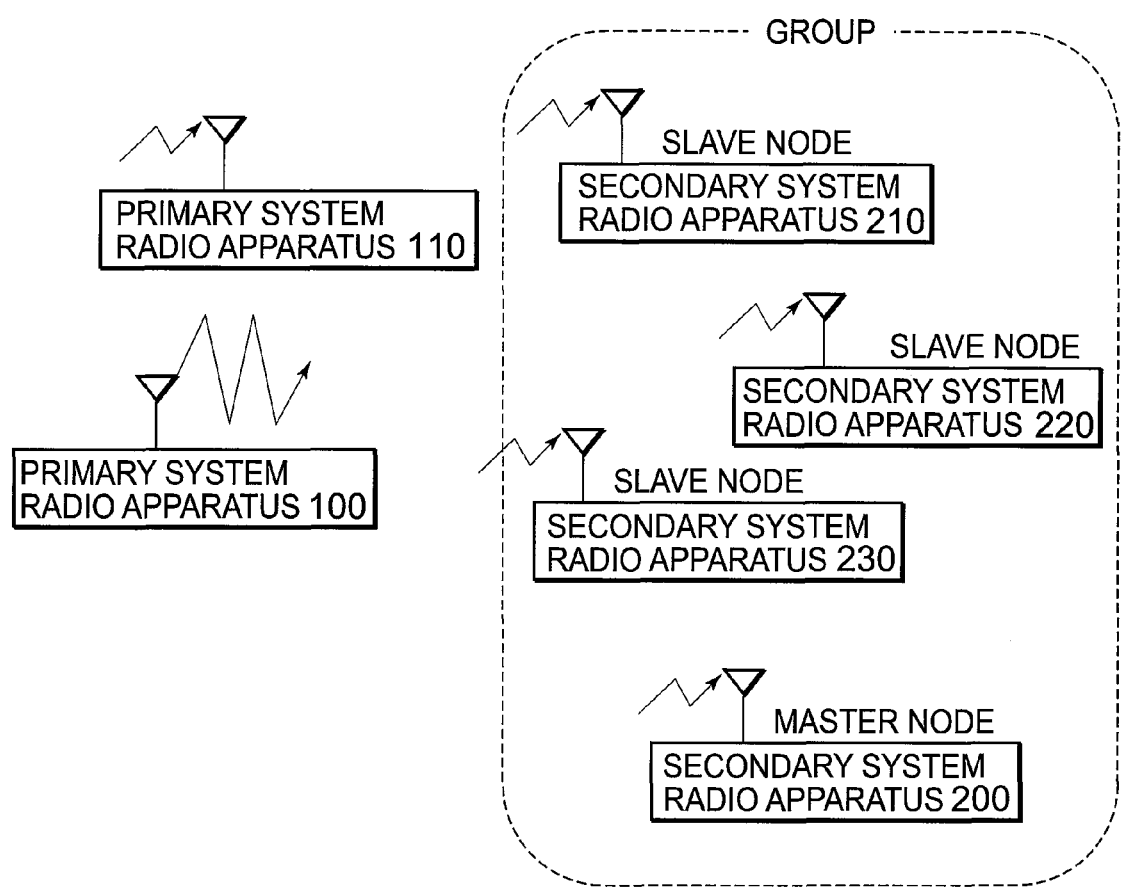
FIG. 1 is a diagram illustrating configurations of a primary system and a secondary system that performs cooperative sensing.
Figure 2A:
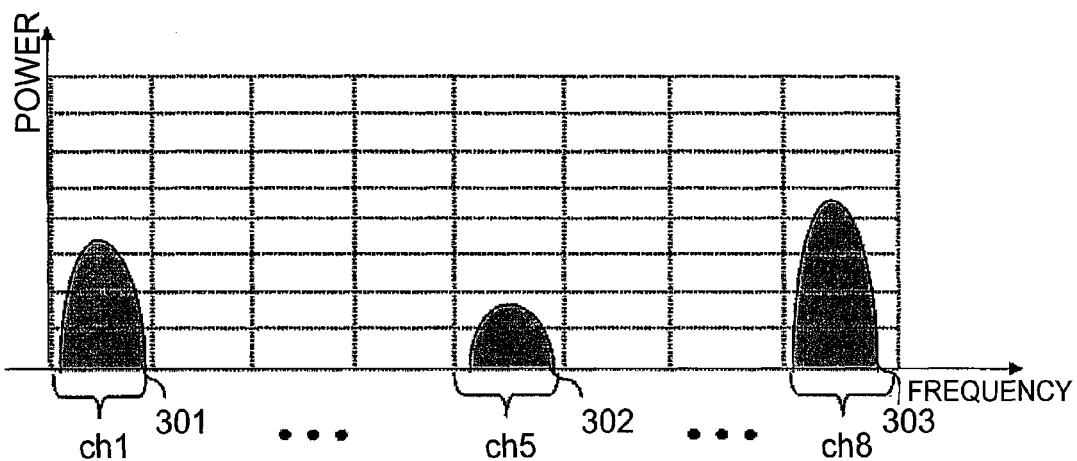
FIG. 2A is an explanatory diagram illustrating allocation of frequency bands in a case where all secondary system radio apparatus perform the cooperative sensing on the same frequency band.
Figure 2B:
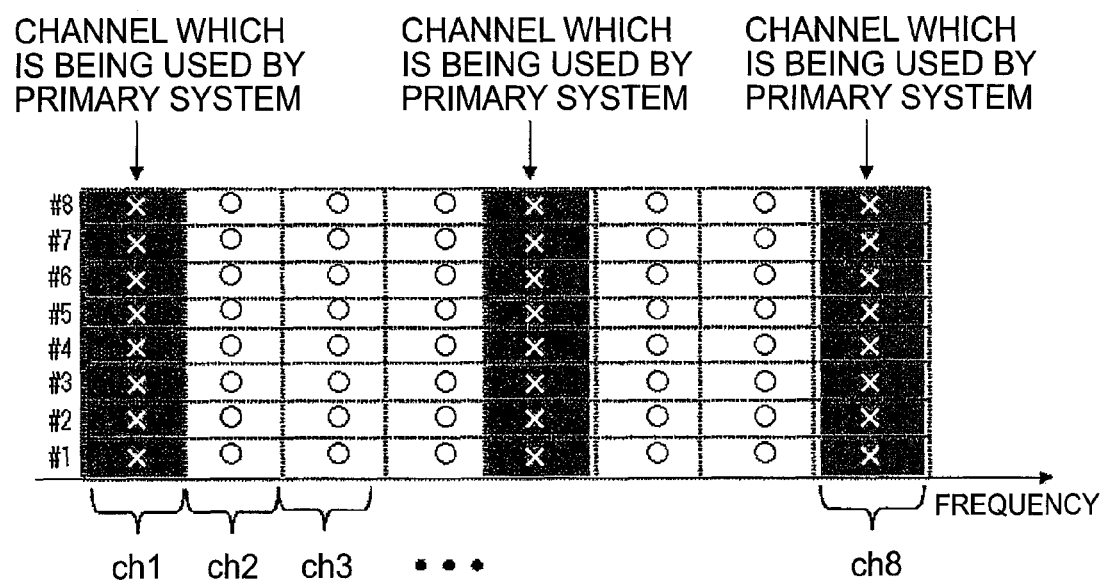
FIG. 2B is an explanatory diagram illustrating the allocation of the frequency bands in the case where all the secondary system radio apparatus perform the cooperative sensing on the same frequency band.
Figure 3:
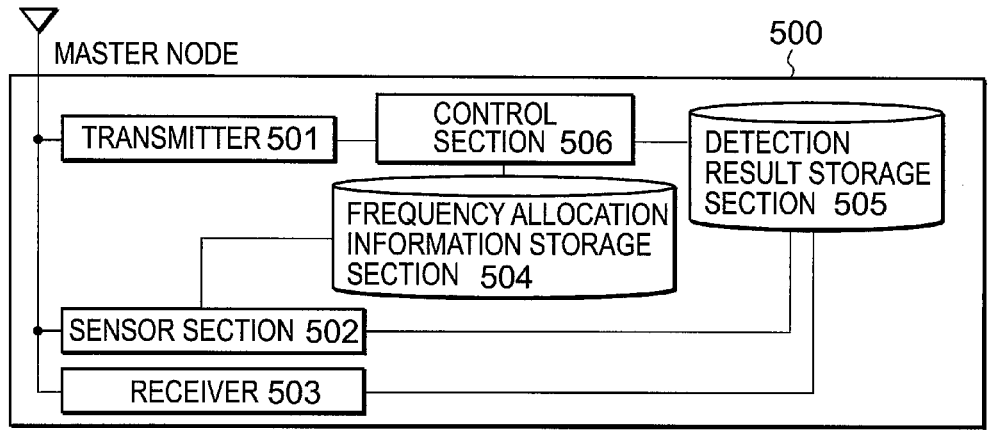
FIG. 3 is a functional block diagram illustrating the secondary system radio apparatus serving as a master node.

FIG. 3 is a functional block diagram illustrating the master node 500, which is the secondary system radio apparatus (cognitive radio apparatus) according to the first embodiment. It should be noted that detailed description of the master node less relevant to this invention is omitted for the sake of the clearness of the description.

The master node 500 includes a transmitter 501 and a receiver 503 for performing communication in the secondary system, a sensor section 502 (detection section) for detecting whether or not the primary system is using a frequency band, that is, detecting a radio wave transmitted from a radio apparatus of another communication system, a frequency allocation information storage section 504 for storing frequency allocation of the primary system, a detection result storage section 505 for collecting and storing information on frequency bands on which the master node 500 and the slave nodes have dealt with detection in the past, and detection results thereof, and a control section 506 for determining a frequency band on which each radio apparatus of the radio apparatus group is to detect a radio wave, and performing various kinds of arithmetic processing and control processing. It should be noted that the storage sections may be divided arbitrarily, that is, information to be stored may be distributed among a plurality of storage sections or all pieces of information may be stored in one storage section.

Figure 4:
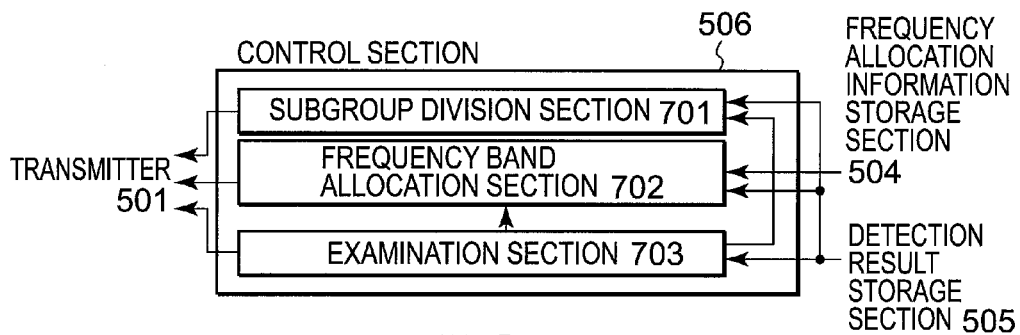
FIG. 4 is a functional block diagram illustrating a control section of the master node.

FIG. 4 is a functional block diagram illustrating the control section 506 of the master node 500.

The control section 506 includes a subgroup division section 701 for dividing the slave nodes and the master node 500 that are included in the cooperative group into one or a plurality of subgroups, a frequency band allocation section 702 for allocating a frequency band on which the secondary system radio apparatus included in each subgroup is to deal with detection, and an examination section 703 for examining based on detection results whether or not a frequency band use condition required by the primary system is satisfied.

The subgroup division section 701 uses the information on the frequency bands on which the master node 500 and the slave nodes deal with the detection, and the detection results thereof, which are stored in the detection result storage section 505, to thereby organize and reorganize the subgroups. Further, the subgroup division section 701 sends, to the transmitter 501, information as to which subgroup each secondary system radio apparatus is included in.

The frequency band allocation section 702 uses the information on the frequency allocation of the primary system, which is stored in the frequency allocation information storage section 504, and the information on the frequency bands on which the master node 500 and the slave nodes have dealt with the detection, and the detection results thereof, which are stored in the detection result storage section 505, to thereby allocate (determine) and reallocate frequency bands which each subgroup is to deal with and are used for detection for the first time and at the next stage. Further, the frequency band allocation section 702 sends, to the transmitter 501, information on the frequency band on which each subgroup is to deal with the detection.

The examination section 703 uses the information on the frequency bands on which the master node 500 and the slave nodes have dealt with the detection (which the master node 500 and the slave nodes collected in the past), and the detection results thereof, which are stored in the detection result storage section 505, to thereby examine whether or not the use condition of the frequency band required by the primary system is satisfied. When an examination result shows that the use condition of the band is satisfied, the examination section 703 sends, to the transmitter 501, information indicating that the band is available. On the other hand, when the use condition of the band is not satisfied, the examination section 703 sends, to the subgroup division section 701 and the frequency band allocation section 702, information indicating that the band is unavailable.

Figure 5:
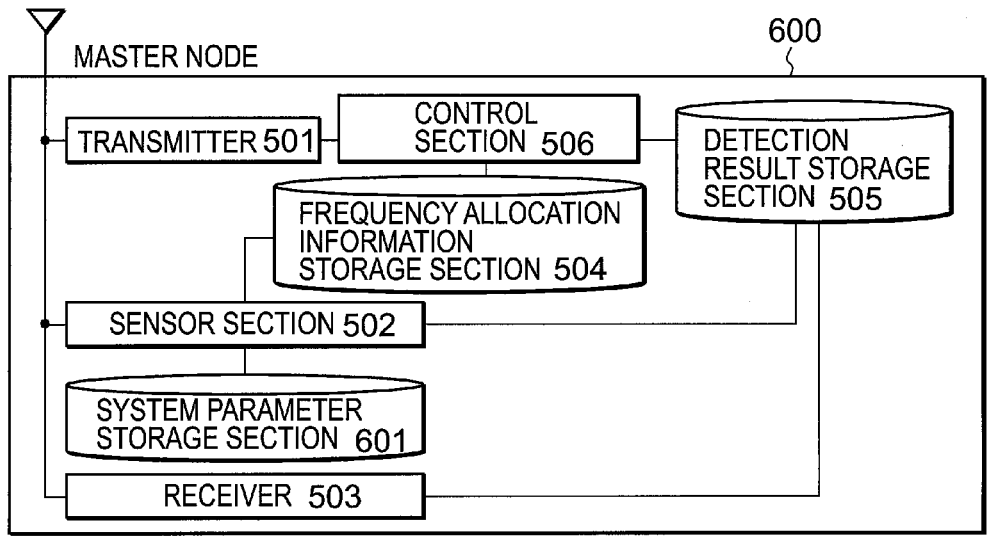
FIG. 5 is a functional block diagram illustrating another master node.

FIG. 5 is a functional block diagram illustrating another master node 600. The master node 600 performs the detection of the primary system by means of spectrum sensing using a feature amount of each system. The master node 600 includes, in addition to the configuration of the master node 500, a system parameter storage section 601 for storing a symbol length, a pilot signal, and the like of a signal transmitted from the primary system. The system parameter storage section 601 is used for the spectrum sensing using a feature amount of the primary system along with the sensor section 502.

It should be noted that the configuration of the master node according to this invention may be implemented by using any of those of the master node 500 and the master node 600.

Figure 6:
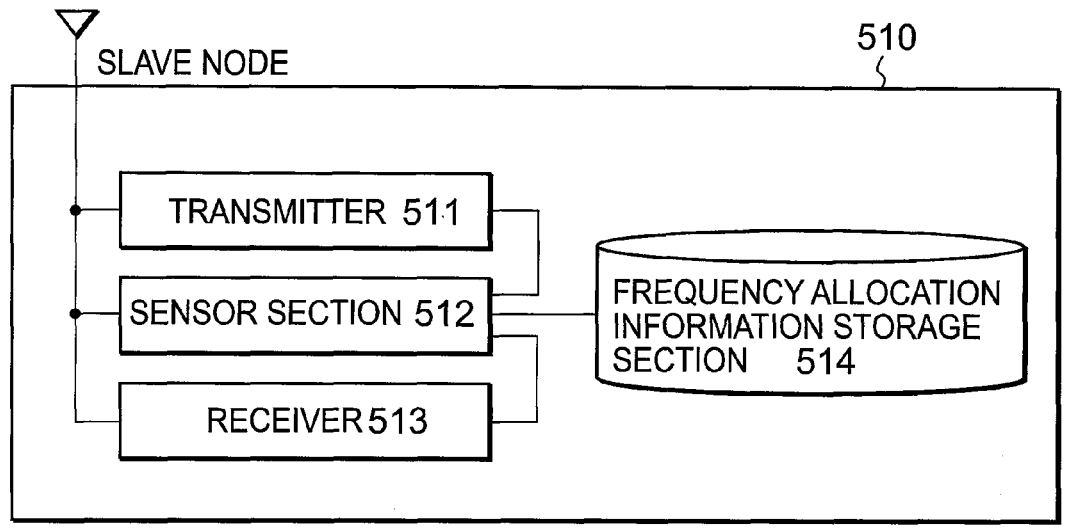
FIG. 6 is a functional block diagram illustrating the secondary system radio apparatus serving as a slave node.

FIG. 6 is a functional block diagram illustrating a slave node 510, which is the secondary system radio apparatus. It should be noted that detailed description of the slave node less relevant to this invention is omitted for the sake of the clearness of the description.

The slave node 510 includes a transmitter 511 and a receiver 513 for performing communication in the secondary system, a sensor section 512 (detection section) for dealing with detection of the primary system on a notified frequency band of a detection target, and a frequency allocation information storage section 514 for storing frequency allocation of the primary system.

The word "deal" herein means that the slave node is responsible for the detection of the primary system on one or a plurality of frequency bands obtained by dividing the entire frequency band of the detection target.

Figure 7:
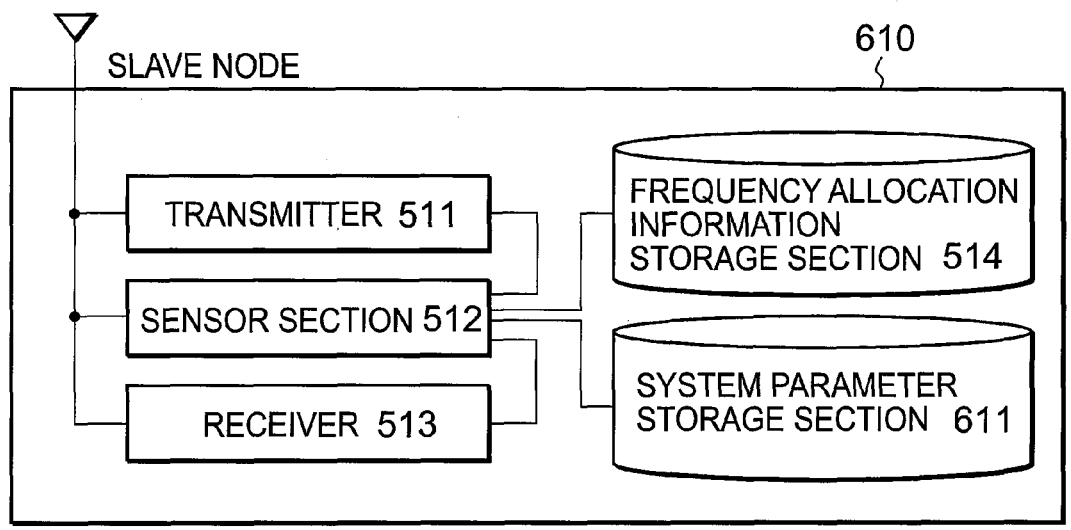
FIG. 7 is a functional block diagram illustrating another slave node.

FIG. 7 is a functional block diagram illustrating another slave node 610. The slave node 610 performs the detection of the primary system by means of the spectrum sensing using a feature amount of each system. The slave node 610 includes, in addition to the configuration of the slave node 510, a system parameter storage section 611 for storing a symbol length, a pilot signal, and the like of a signal transmitted from the primary system. The system parameter storage section 611 is used for the spectrum sensing using a feature amount of the primary system along with the sensor section 512.

It should be noted that the configuration of the slave node according to this invention may be implemented by using any of those of the slave node 510 and the slave node 610.

Next, description is given of an example of an operation of the first embodiment.

Figure 8:
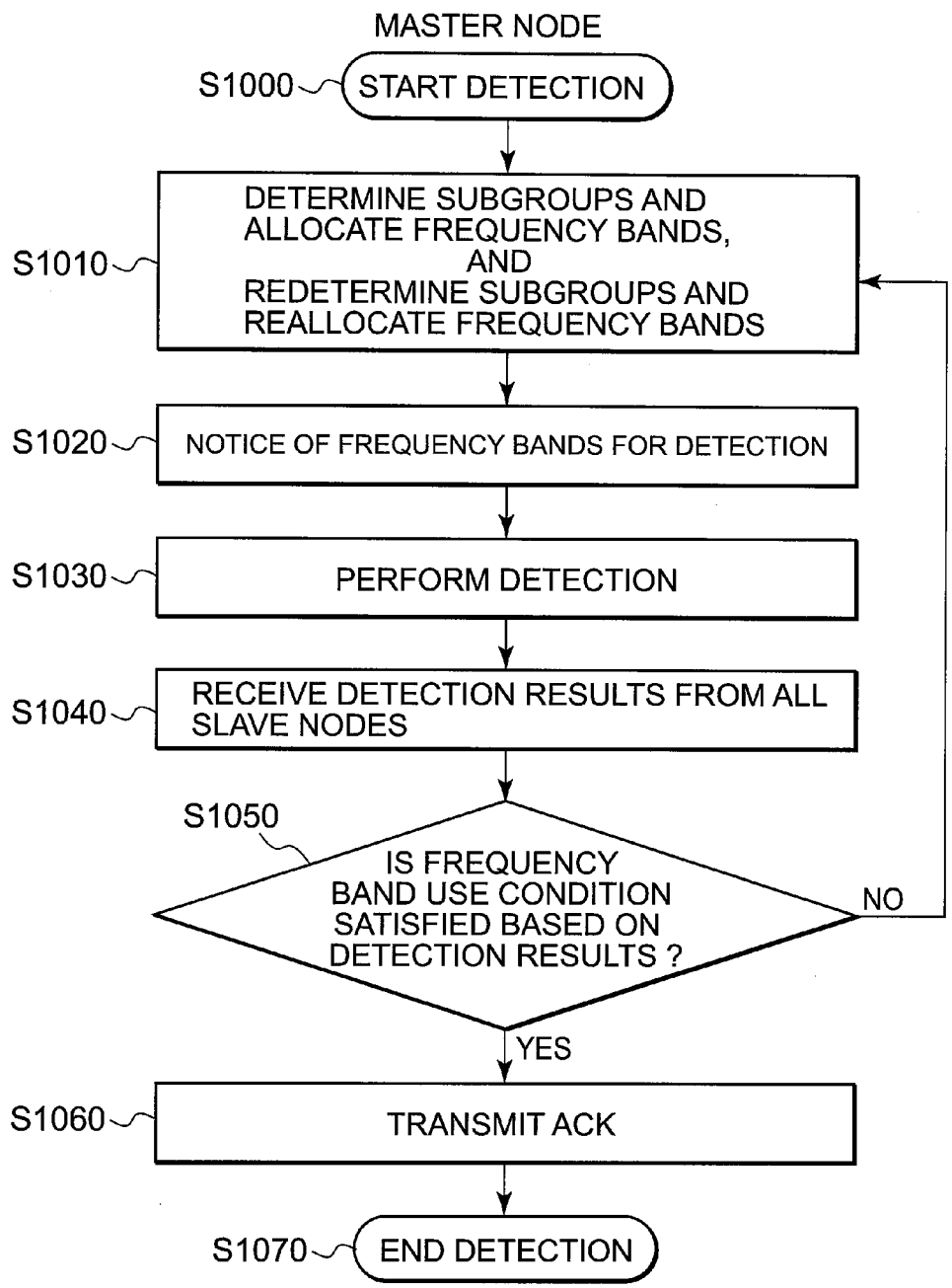
FIG. 8 is a flow chart illustrating an operation regarding detection performed by the master node.

FIG. 8 is a flow chart illustrating an operation regarding detection of the primary system performed by the master node 500. Hereinbelow, this flow chart is used for the description.

The control section 506 of the master node 500 determines to start detection (Step S1000).

Subsequently, the subgroup division section 701 of the control section 506 divides the whole of the slave nodes and the master node 500 itself that are included in the cooperative group into one or a plurality of subgroups. Further, the frequency band allocation section 702 of the control section 506 allocates a frequency band which each subgroup is to deal with for the detection of the primary system (Step S1010). On this occasion, all the slave nodes included in the same subgroup are set to perform the detection of the primary system on the same frequency band. It should be noted that the division into the subgroups and the allocation of the frequency bands are described later in detail by taking some examples.

Subsequently, the transmitter 501 notifies the slave nodes of the frequency band allocated to each subgroup in Step S1010 (Step S1020).

Subsequently, the sensor section 502 performs the detection of the primary system on the frequency band allocated to the subgroup including the master node 500 itself (Step S1030).

Subsequently, the receiver 503 receives detection results transmitted from the slave nodes (Step S1040).

Further, the examination section 703 of the control section 506 uses the detection results received from the slave nodes, a detection result obtained by the master node 500 itself, and previous detection results obtained by the master node 500 and the slave nodes, to thereby examine whether or not the frequency band use condition is satisfied. When the use condition is satisfied, the operation proceeds to the subsequent step, while when the use condition is not satisfied, the operation returns to Step S1010 (Step S1050). It should be noted that when the use condition is not satisfied, in Step S1010, the examination section 703 uses the information on the frequency bands on which the master node 500 and the slave nodes have dealt with the detection in the past, and the information on the detection results thereof, which are recorded in the detection result storage section 505, to thereby reorganize the subgroups and reallocate the frequency band on which each subgroup is to deal with the detection. Then, the operation proceeds to Step S1020.

When the frequency band use condition is satisfied, the control section 506 transmits, to all the slave nodes, acknowledgements (ACKs) indicating that the detection has been completed (Step S1060).

The control section 506 repeats the above-mentioned operation until the frequency band use condition is satisfied. After the ACKs are transmitted when the frequency band use condition is satisfied, the operation regarding the detection is ended (Step S1070).

As described above, the cooperative group is formed primarily of the master node, the frequency band of the detection target is divided into the subgroups, and the slave nodes that are to perform the detection are allocated to each subgroup. Accordingly, the primary system that is using the frequency band of the detection target can be detected with high efficiency.

In addition, the master node redetermines the subgroups and reallocates the frequency bands as described later, to enable the accuracy of the detection of the primary system to be maintained, and at the same time, the processing amount and the processing time of each node to be reduced. In other words, it becomes possible to detect another radio communication system with high efficiency.

Next, by taking a plurality of examples, description is given of the division into the subgroups, the allocation of the frequency bands on which each subgroup is to perform the detection, redivision of the subgroups, and reallocation of the frequency bands, which are performed in Step S1010.

Figure 9:
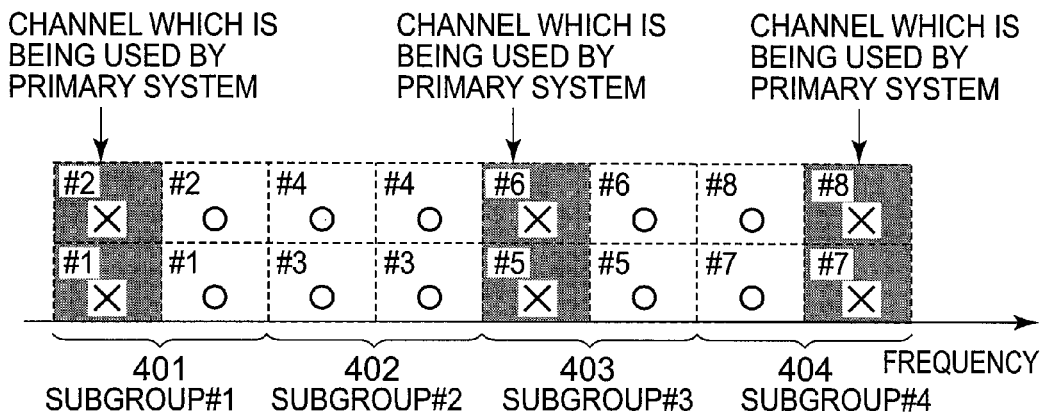
FIG. 9 is a diagram illustrating an example of subgroups including the secondary system radio apparatus and allocation of the frequency bands on which each subgroup is to deal with detection of the primary system.

FIG. 9 is a diagram illustrating an example of the subgroups including the secondary system radio apparatus and the allocation of the frequency bands on which each subgroup is to deal with the detection of the primary system.

In FIG. 9, divided is a cooperative group formed of eight nodes in total (eight secondary system radio apparatus). A node #1 and a node #2 are allocated to a subgroup #1 (401); a node #3 and a node #4, a subgroup #2 (402); a node #5 and a node #6, a subgroup #3 (403); and a node #7 and a node #8, a subgroup #4 (404). With regard to the secondary system radio apparatus in this example, no particular distinction is made between the master node and the slave node. The master node performs the detection on the frequency band allocated by the master node itself similarly to the slave node, and is thus responsible for a part of the cooperative sensing.

In the example of FIG. 9, each of the subgroups involves frequency bands corresponding to two channels. In this example, the same number of channels are allocated so as to balance processing loads of the spectrum sensing performed by the respective nodes. Each secondary system radio apparatus performs the spectrum sensing for the detection of the primary system on each channel, and a result thereof is indicated by a symbol "○" (the primary system is not using the band) or a symbol "×" (the primary system is using the band).

Figure 10:
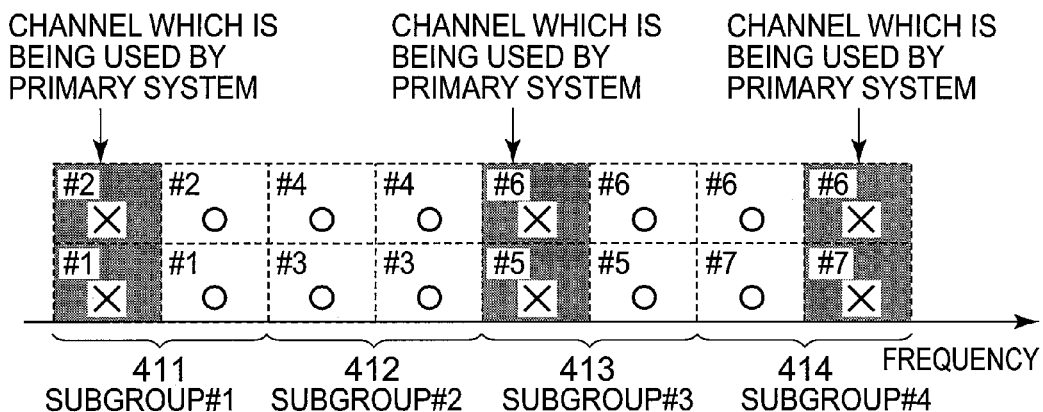
FIG. 10 is a diagram illustrating another example of the subgroups including the secondary system radio apparatus and the allocation of the frequency bands on which each subgroup is to deal with the detection of the primary system.

FIG. 10 is a diagram illustrating another example of the subgroups including the secondary system radio apparatus and the allocation of the frequency bands on which each subgroup is to deal with the detection of the primary system.

The division into the subgroups and the allocation of the frequency bands that are illustrated in FIG. 10 are different from those illustrated in FIG. 9 in that the number of nodes is seven in total and the node #6 is included in both a subgroup #3 (413) and a subgroup #4 (414) in FIG. 10. Through the above-mentioned division into the subgroups, the cooperative sensing may effectively be performed in such a case where the node #6 may use a spectrum sensing method with higher accuracy as compared with the other nodes, and a case where the node #6 may be supplied with power from a power source and hence power consumption thereof is not so problematic as compared with the other nodes. As described in this example, the secondary system radio apparatus may be included in a plurality of subgroups.

Figure 11:
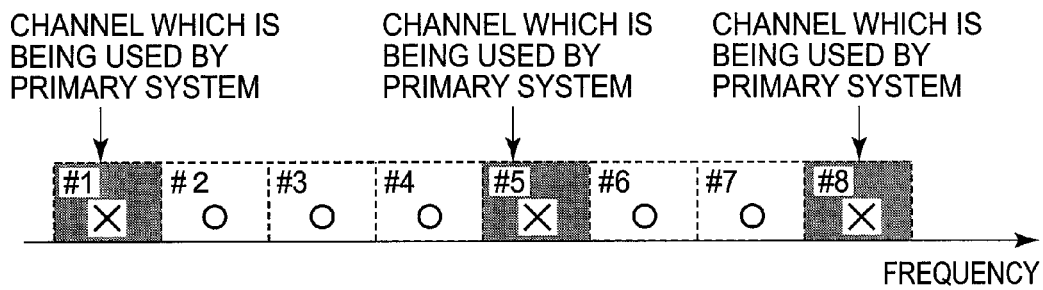
FIG. 11 is a diagram illustrating a further example of the subgroups including the secondary system radio apparatus and the allocation of the frequency bands on which each subgroup is to deal with the detection of the primary system.

FIG. 11 is a diagram illustrating a further example of the subgroups including the secondary system radio apparatus and the allocation of the frequency bands on which each subgroup is to deal with the detection of the primary system.

In the example of the division into the subgroups and the allocation of the frequency bands that are illustrated in FIG. 11, eight nodes in total are divided into eight subgroups, and hence the detection of the primary system on each divided frequency band is entirely performed by one node. Separating the frequency bands on which the nodes are to perform the spectrum sensing on a one-on-one basis enables the spectrum sensing to be performed in a wider band. In addition, it becomes possible to reduce the processing amount required for the spectrum sensing performed at each node. As described in this example, one node may be included in each subgroup instead of the case of a plurality of nodes included therein.

Figure 12:
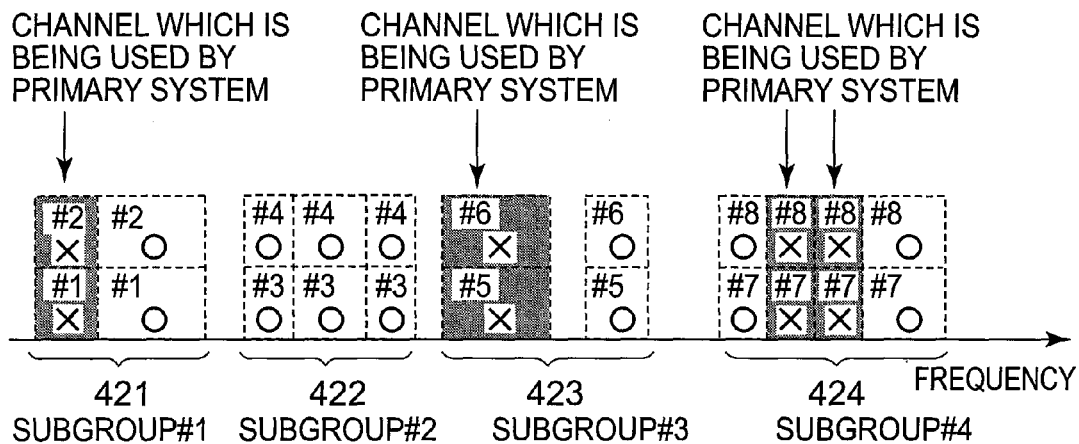
FIG. 12 is a diagram illustrating a still further example of the subgroups including the secondary system radio apparatus and the allocation of the frequency bands on which each subgroup is to deal with the detection of the primary system.

FIG. 12 is a diagram illustrating a still further example of the subgroups including the secondary system radio apparatus and the allocation of the frequency bands on which each subgroup is to deal with the detection of the primary system.

In the example of the division into the subgroups and the allocation of the frequency bands that are illustrated in FIG. 12, the frequency bands allocated to the respective subgroups are not continuous and are arranged discretely. Further, the frequency bands allocated to a subgroup #3 (423) include channels of discontinuous frequency bands. As described in this example, the divided frequency bands are not necessarily continuous, and similarly, channels within the divided frequency bands are not necessarily continuous. In addition, as illustrated in FIG. 12, the number of channels included in the divided frequency bands and the bandwidths of the channels are not necessarily unified.

Figure 13:
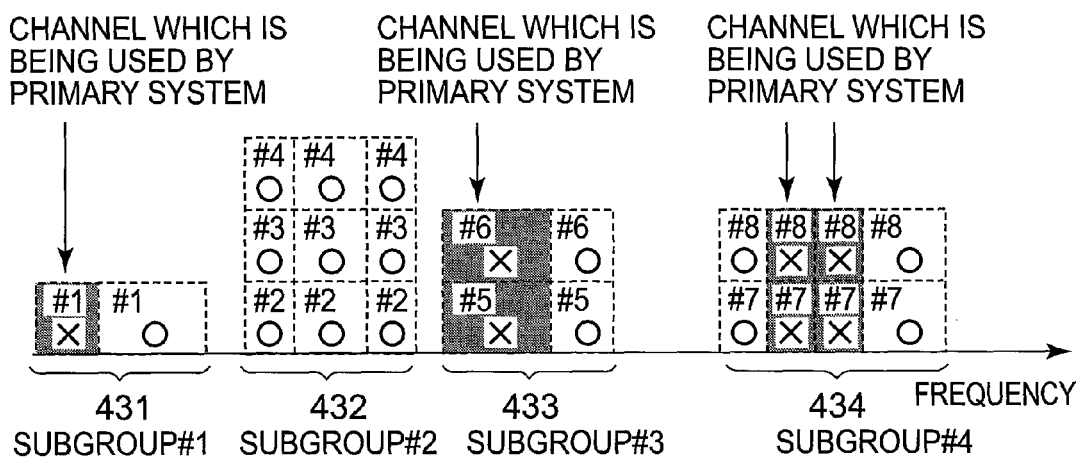
FIG. 13 is a diagram illustrating a yet further example of the subgroups including the secondary system radio apparatus and the allocation of the frequency bands on which each subgroup is to deal with the detection of the primary system.

FIG. 13 is a diagram illustrating a yet further example of the subgroups including the secondary system radio apparatus and the allocation of the frequency bands on which each subgroup is to deal with the detection of the primary system.

In the example illustrated in FIG. 13, a different number of the secondary system radio apparatus are included in each subgroup. In a case where previous detection results of the frequency bands may be used or other such case, the frequency bands may be classified into frequency bands that are high in frequency of use by the primary system and frequency bands that are low in frequency of use by the primary system, and the master node may vary the number of nodes that are to perform the spectrum sensing based on the frequency of use by the primary system as in this example. For example, in FIG. 13, in a case where the frequency bands allocated to a subgroup #1 (431) may be determined as bands that are low in frequency of use by the primary system based on the previous detection results of the bands, the probability of interference of the secondary system with the primary system that is using the bands is low, and hence the number of nodes that are to perform the spectrum sensing is set to one. In contrast, in a case where the frequency bands allocated to a subgroup #2 (432) may be determined to be high in frequency of use by the primary system based on the previous detection results of the bands, the probability of interference of the secondary system with the primary system that is using the bands is high, and hence the number of nodes that are to perform the spectrum sensing is increased to three for detection with higher accuracy. With this method, it becomes possible to lower the probability of interference with the primary system.

Further, there may be employed a method of varying the number of nodes that are to perform the spectrum sensing on the frequency bands to use a free frequency band actively. For example, in FIG. 13, in a case where the frequency bands allocated to the subgroup #1 (431) may be determined as bands that are high in frequency of use by the primary system based on the previous detection results of the bands, the probability that the secondary system may use the bands is low, and hence the number of nodes that are to perform the spectrum sensing is set to one. In contrast, in a case where the frequency bands allocated to the subgroup #2 (432) may be determined to be low in frequency of use by the primary system based on the previous detection results of the bands, the probability that the secondary system may use the bands is high, and hence the number of nodes that are to perform the spectrum sensing is increased to three for detection with higher accuracy. Accordingly, frequency bands which are not being used by the primary system can be detected reliably.

In the above-mentioned examples of FIGS. 9, 10, 11, 12, and 13, the detection result obtained by each secondary system radio apparatus shows that the primary system is "not using" the frequency band or that the primary system is "using" the frequency band, but the detection result is not necessarily limited thereto. For example, in a case where each node uses power detection for the spectrum sensing, a reception power value or a value obtained by quantizing the reception power value at several levels may be used as the detection result. In the examples, for the sake of the clearness of the description, the detection result is represented by the binary values of "not using" and "using".

Further, the frequency band use condition used for the examination in Step S1050 of FIG. 8 corresponds to, for example, a condition that a misdetection rate falls below a value required by the primary system. The misdetection rate is a rate of failure in detection of the primary system despite the presence of the primary system, resulting in the determination that the primary system is "not using" the frequency band. In this case, when there is obtained such a detection result that satisfies the value of the misdetection rate required by the primary system or defined in advance as a policy, an ACK is transmitted from the master node 500 to the slave node.

Still further, when the frequency band use condition is not satisfied in Step S1050 of FIG. 8, as the reorganization of the subgroups and the reallocation of the frequency bands on which each subgroup is to deal with the detection, the subgroups are reorganized and the frequency bands are reallocated so that each secondary system radio apparatus deals with detection on a band different from the band on which the secondary system radio apparatus has already dealt with the detection. In other words, the cooperative group to which the own apparatus belongs is divided into the subgroups so that a frequency band different from a frequency band of the another radio communication system, on which the radio apparatus of the cooperative group to which the own apparatus belongs has already performed the detection, is allocated as a frequency band for detection of the another radio communication system for the next time and thereafter.

Figure 14:
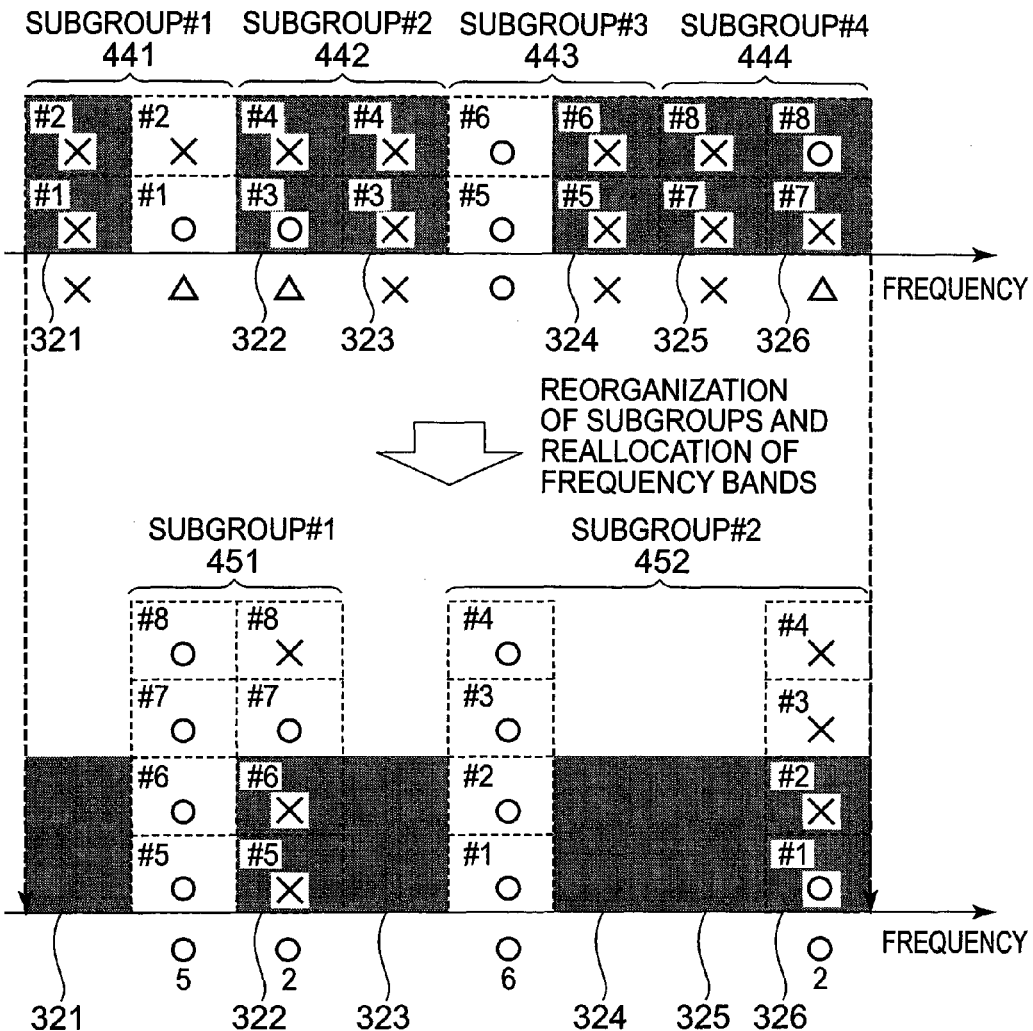
FIG. 14 is a diagram illustrating an example of reorganization of the subgroups and reallocation of the frequency bands.

FIG. 14 is a diagram illustrating an example of the reorganization of the subgroups and the reallocation of the frequency bands. FIG. 14 illustrates, in the upper part thereof, formation of the subgroups and allocation of the frequency bands at the first stage, while in the lower part thereof, formation of reorganized subgroups and reallocation of the frequency bands at the second stage thereafter. It should be noted that the frequency bands in the upper part are the same as the frequency bands in the lower part.

At the first stage illustrated in the upper part of FIG. 14, eight nodes (#1 to #8) of the secondary system are divided into four subgroups for the detection of the primary system. The detection result obtained by each node is indicated by the symbol "○" when the primary system is "not using" the frequency band, or the symbol "×" when the primary system is "using" the frequency band. The detection results are obtained by two nodes for each of two channels within the divided bands allocated to each subgroup. The master node 500, which receives the detection results from the slave nodes, determines a status of each channel usage situation in the primary system.

In the example illustrated in FIG. 14, the master node 500 determines a channel in the subgroup to be "○" when the detection results obtained by two nodes therein are "○" (corresponding to a channel that can be used with high possibility), to be "Δ" when the detection result obtained by one node is "○" while the detection result obtained by the other node is "×" (corresponding to a channel on which determination of availability cannot be made), and to be "×" when the detection results obtained by the two nodes are both "×" (corresponding to a channel that cannot be used with high possibility).

The determination result is shown under each channel. The master node 500 selects four channels with the determination results of "○" and "Δ" as candidates of channels to be used. Next, in the detection of the primary system at the second stage, the subgroups are reorganized as illustrated in the lower part of FIG. 14. There are set a new subgroup #1 (451) including the node #5, the node #6, the node #7, and the node #8, and a new subgroup #2 (452) including the node #1, the node #2, the node #3, and the node #4, and the frequency bands are allocated thereto, respectively.

In this case, in the lower part of FIG. 14, the two channels allocated to the new subgroup #1 (451) are the channels originally allocated to the node #1, the node #2, the node #3, and the node #4 as illustrated in the upper part of FIG. 14, and the nodes allocated at the second stage are different from the nodes allocated at the first stage. The same applies to the frequency bands allocated to the new subgroup #2 (452).

Subsequently, the nodes perform the detection on the frequency bands allocated thereto, respectively, and then the slave nodes transmit detection results to the master node 500. The master node 500 examines again whether or not the frequency band use condition is satisfied based on the received detection results. Shown under each channel in the lower part of FIG. 14 is a total number of nodes that have determined the channel to be "○" as the detection results of the first stage and the second stage, that is, a total number of nodes that have made determination as "not using". The total number of nodes may be used for selecting a channel to be used for communication.

In this manner, the master node 500 may also perform examination using in combination the detection results of the first stage and the detection results of the second stage after the reorganization of the subgroups.

Figure 15:
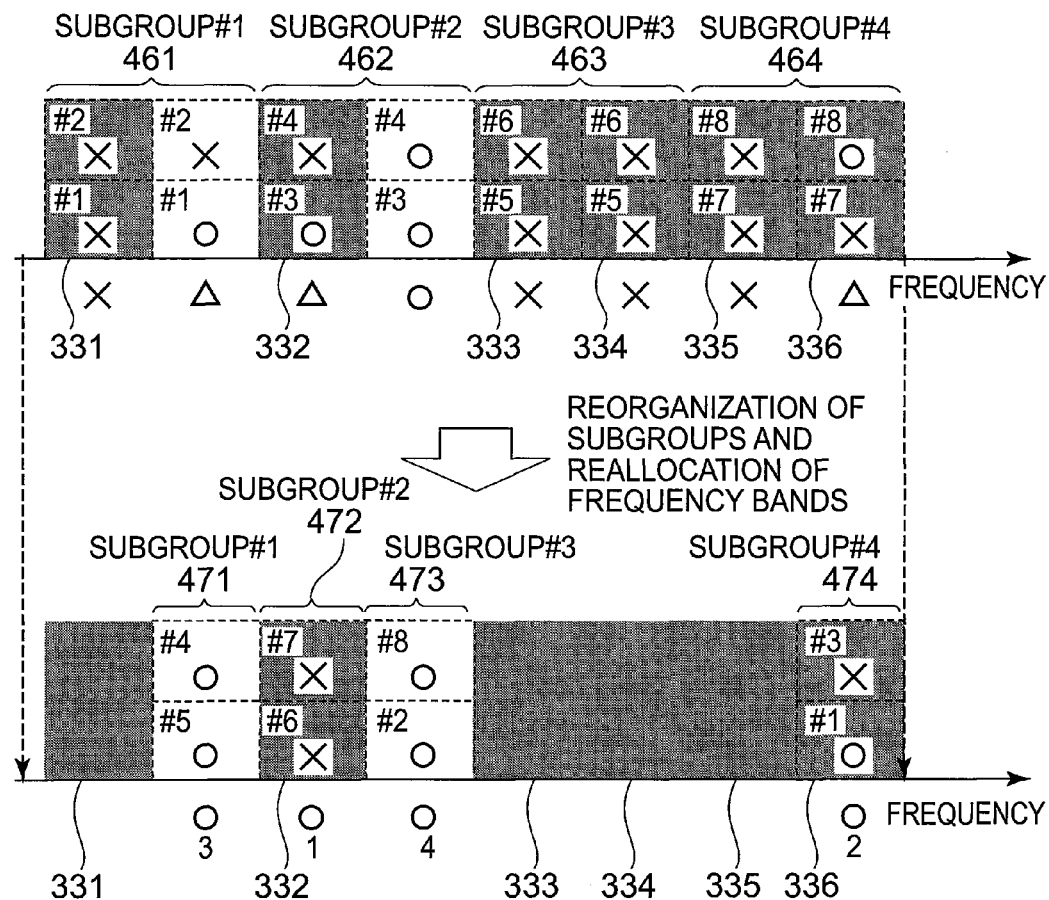
FIG. 15 is a diagram illustrating another example of the reorganization of the subgroups and the reallocation of the frequency bands.

FIG. 15 is a diagram illustrating another example of the reorganization of the subgroups and the reallocation of the frequency bands.

In FIG. 15, two channels are allocated to each subgroup in the detection at the first stage whereas one channel is allocated to each subgroup in the second detection after the subgroups are reorganized. In this manner, the number of channels on which each node is to perform the detection may be varied between the detection at the first stage and the detection at the second stage.

Figure 16:
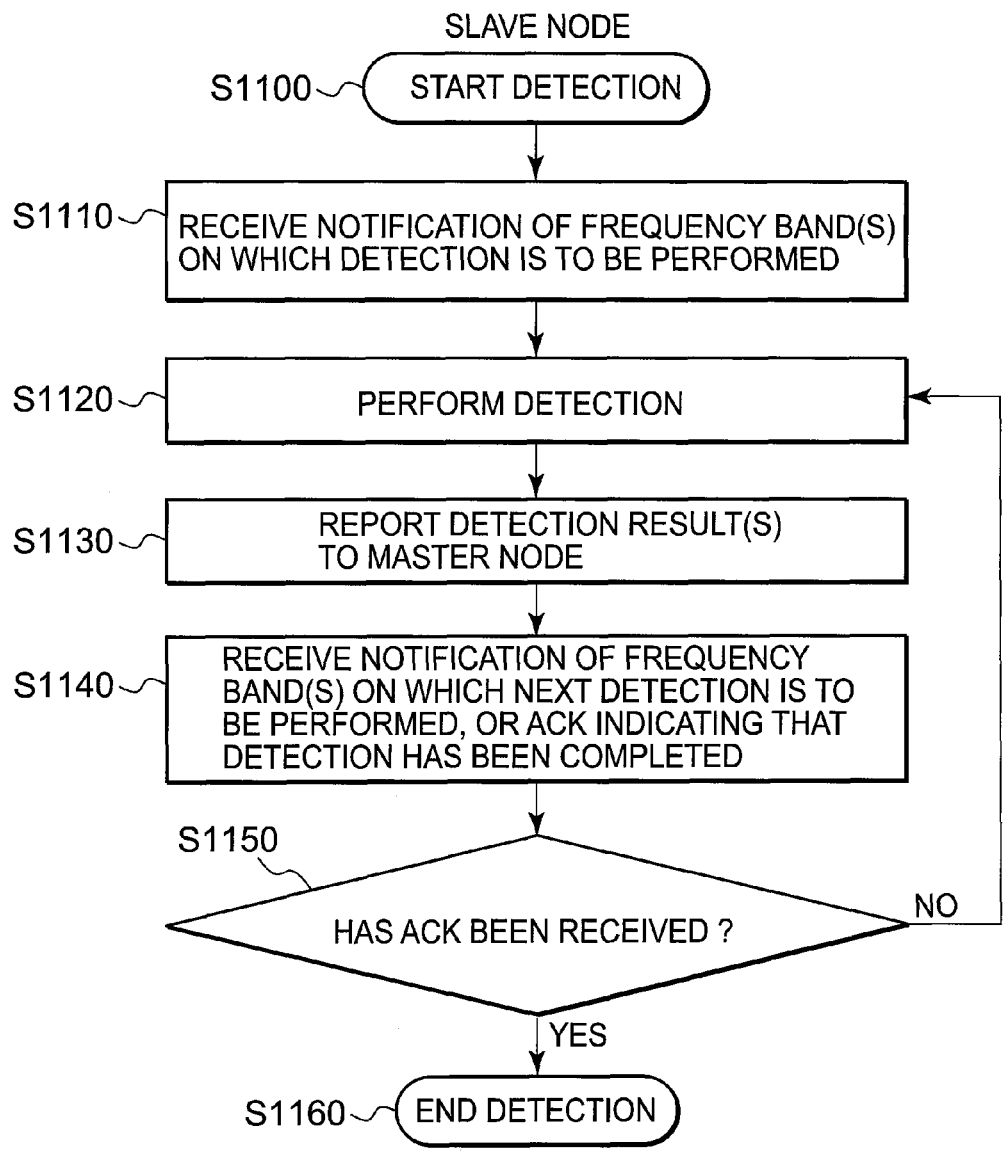
FIG. 16 is a flow chart illustrating an operation regarding detection performed by the slave node.

FIG. 16 is a flow chart illustrating an operation regarding detection of the primary system performed by the slave node 510. Hereinbelow, this flow chart is used for the description.

The slave node 510 starts the detection operation (Step S1100).

The receiver 513 receives a specification of a frequency band (channel) on which the detection of the primary system is to be performed, the specification being transmitted from the master node 500 (Step S1110).

The sensor section 512 performs the detection of the primary system on the notified frequency band (Step S1120).

The transmitter 511 reports a detection result obtained in Step S1120 to the master node 500 (Step S1130).

Subsequently, the receiver 513 receives a notification of a frequency band on which the detection of the primary system is to be performed at the next stage, or an ACK indicating that the detection of the primary system has been completed, being transmitted from the master node 500 (Step S1140).

The receiver 513 judges whether or not the ACK is received. When the ACK is received, the operation proceeds to the next step, while when the ACK is not received (when the notification of a frequency band on which the detection of the primary system is to be performed is received), the sensor section 512 performs the detection of the primary system on the band in Step S1120 (Step S1150).

When the receiver 513 receives the ACK, the detection is ended (Step S1160).

It should be noted that in the above-mentioned operation of the first embodiment, in order to lower the probability of failure in the detection of the primary system, in the detection of the primary system at the second stage and thereafter (for the second time and thereafter or for the next time and thereafter), the previous detection results are used for selecting frequency bands having low possibility of use by the primary system as candidates of frequency bands to be used by the secondary system, to thereby perform the detection at the second stage and thereafter. Conversely, in the same operation, in order to secure a wider frequency band, frequency bands having high possibility of use by the primary system may be selected to perform the detection at the second stage and thereafter for the purpose of examining whether or not the frequency bands cannot be used in actuality.

Further, in the above-mentioned embodiment, the master node and the slave nodes operate in synchronization with each other at the first stage, the second stage, and thereafter. The synchronization may be achieved based on a synchronization signal issued by the master node. Alternatively, the master node and the slave nodes may operate in an asynchronous manner. In this case, the master node may perform processing as appropriate by using current detection results and previous detection results that have been collected by the master node. Still further, in the above-mentioned embodiment, the master node transmits notifications of frequency bands from the master node to the slave nodes, and stops processing until the master node receives detection results from all the slave nodes. However, the master node does not necessarily stop the processing. In this case, the master node may perform processing as appropriate by using current search results and previous search results that have been collected by the master node.

Next, description is given of an effect of the first embodiment. The first embodiment provides the configuration in which the detection at the second stage and thereafter is performed after the reorganization in which each secondary system radio apparatus is allocated to a frequency band different from the frequency band on which the secondary system radio apparatus has already performed the detection of the primary system. Hence, more detection results obtained by different secondary system radio apparatus may be used for each frequency band, and influences of a radio propagation environment can be alleviated owing to the spatially different arrangement in the secondary system. Accordingly, reliability of the detection of the primary system can be improved. In other words, more detection results obtained by different secondary system radio apparatus may be used for each frequency band, and hence a multi-user diversity effect may be obtained, with the result that influences of a radio propagation (fading and shadowing) can be alleviated.

Next, a second embodiment of this invention is described.

The second embodiment is different from the first embodiment only in the operation performed by the master node (method of reorganizing the subgroups when the frequency band use condition is not satisfied in Step S1050 of FIG. 8).

In the method of reorganizing the subgroups according to the second embodiment, the subgroups are reorganized so as to include evenly or at least, in detection of another radio communication system for the next time and thereafter, radio apparatus that have successfully detected another radio communication system. In other words, the reorganization is performed so as not to form a subgroup including only secondary system radio apparatus that have determined in the previous detection that there is no primary system, or a subgroup including many secondary system radio apparatus described above.

Figure 17:
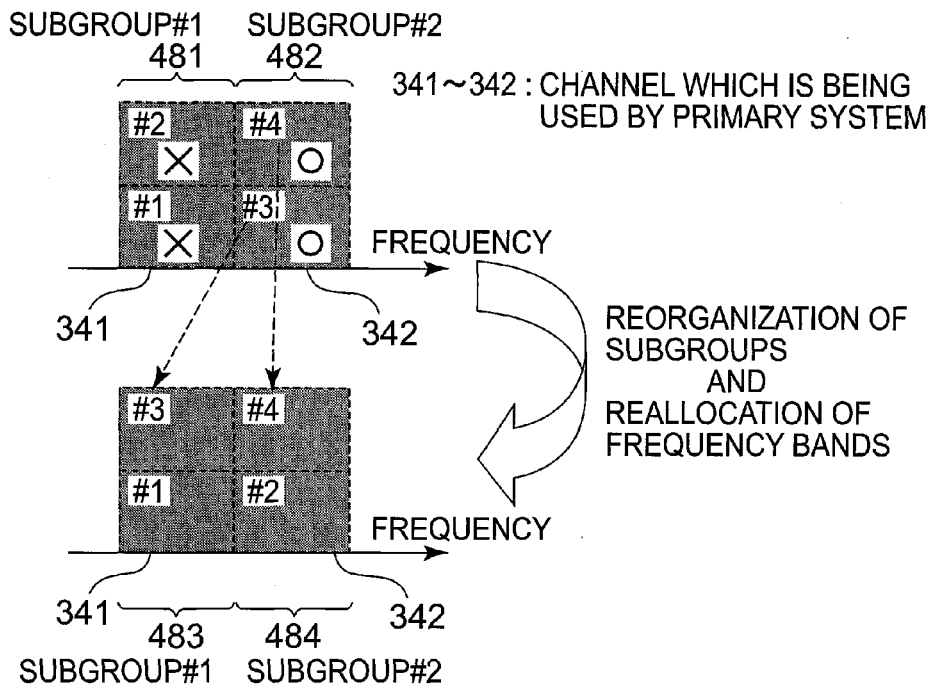
FIG. 17 is a diagram illustrating an example of reorganization of the subgroups and reallocation of the frequency bands according to a second embodiment of this invention.

FIG. 17 is a diagram illustrating an example of reorganization of the subgroups and reallocation of the frequency bands according to the second embodiment. This example shows only allocation of frequency bands for four secondary system radio apparatus (node #1, node #2, node #3, and node #4), and omits allocation for the other secondary system radio apparatus for the sake of the clearness of the description.

In the detection at the first stage illustrated in the upper part of FIG. 17, the secondary system radio apparatus that have determined that there is no primary system (◯) are the node #3 and the node #4, which are allocated to a subgroup #2 (482). Therefore, in the detection at the second stage illustrated in the lower part of FIG. 17, the subgroups are reorganized so that the node #3 and the node #4 are not included in the same subgroup. The node #3 is allocated to a new subgroup #1 (483) and the node #4 is allocated to a new subgroup #2 (484).

Next, description is given of an effect of the second embodiment. The effect of the second embodiment is improvement in reliability of the detection of the primary system. This effect is obtained for the following reason. That is, the secondary system radio apparatus that has determined that there is a primary system may have a high average signal to noise ratio (SNR) whereas the secondary system radio apparatus that has detected no primary system may have a low average SNR. Hence, eliminating the case where the secondary system radio apparatus having a low average SNR with high possibility are included in the same subgroup enables reduction in probability of forming a subgroup in which all the secondary system radio apparatus determine that there is no primary system irrespective of whether or not there is any primary system.

In other words, the secondary system radio apparatus that has determined that there is no primary system may have a low average SNR, and hence, a subgroup including only radio apparatus having a low average SNR is prevented from being formed, to thereby reduce the probability of erroneously determining that there is no primary system irrespective of the fact that there is a primary system.

Next, a third embodiment of this invention is described.

The third embodiment is different from the first embodiment only in the operation performed by the master node (method of reorganizing the subgroups and method of allocating the frequency bands when the frequency band use condition is not satisfied in Step S1050 of FIG. 8).

In the method of reorganizing the subgroups and the method of reallocating the frequency bands which have been allocated to the subgroups on which the detection of the primary system is to be performed according to the third embodiment, in the detection of the second stage and thereafter, the subgroups are reorganized and the frequency bands are reallocated so that a frequency band spaced apart from the frequency band on which each secondary system radio apparatus has dealt with the detection in the past is allocated to the secondary system radio apparatus. In other words, in the detection of another radio communication system for the next time and thereafter, the subgroups are reorganized so that a frequency band different and spaced apart from the frequency band on which the radio apparatus of the cooperative group to which the own apparatus belongs has already performed the detection is set as a frequency band for detection of another radio communication system for the next time and thereafter.

Figure 18:
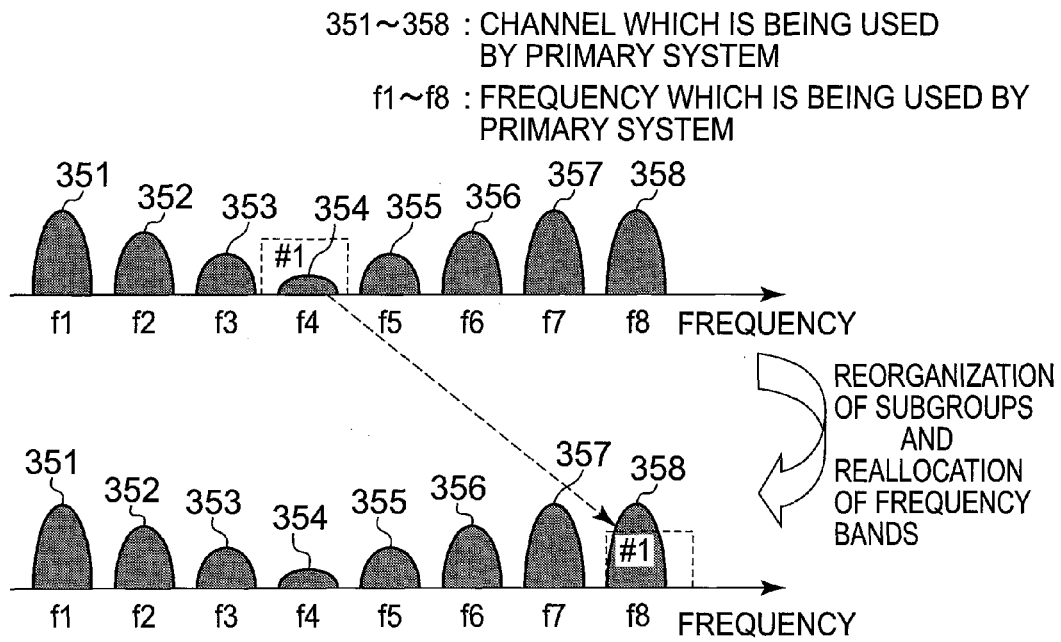
FIG. 18 is a diagram illustrating an example of reorganization of the subgroups and reallocation of the frequency bands according to a third embodiment of this invention.

FIG. 18 is a diagram illustrating an example of reorganization of the subgroups and reallocation of the frequency bands according to the third embodiment. This example shows only one secondary system radio apparatus (node #1), and omits the other secondary system radio apparatus for the sake of the clearness of the description.

In the detection at the first stage illustrated in the upper part of FIG. 18, the node #1 is allocated to a frequency band of a frequency f4. Therefore, the subgroups are reorganized and the frequency bands are reallocated so that the node #1 is allocated to a frequency spaced apart from the frequency f4. In the detection at the second stage illustrated in the lower part of FIG. 18, the node #1 is allocated to a frequency band of a frequency f8.

Next, description is given of an effect of the third embodiment. The effect of the third embodiment is improvement in reliability of the detection of the primary system in a case where the signal transmitted from the primary system is a signal having a frequency correlation in the frequency band on which the detection is performed, and the signal is influenced by frequency selective fading. This effect is obtained for the following reason. That is, in the environment of the frequency selective fading, the frequency correlation becomes smaller between frequency bands spaced apart from each other, and therefore a frequency band having a smaller frequency correlation is selected in the detection at the second stage and thereafter, to thereby avoid a case where the secondary system radio apparatus having a high average SNR is incessantly influenced by the drop in reception level caused by the frequency selective fading. As a result, detection performed by the secondary system radio apparatus having a high average SNR is effectively utilized. In other words, the channel influenced by the frequency selective fading has a smaller correlation with a channel of a frequency spaced apart therefrom, which prevents constant allocation of a channel low in reception level to the radio apparatus having a high average SNR.

Next, a fourth embodiment of this invention is described.

The fourth embodiment is different from the first embodiment only in the operation performed by the master node (method of reorganizing the subgroups when the frequency band use condition is not satisfied in Step S1050 of FIG. 8).

In the method of reorganizing the subgroups according to the fourth embodiment, reorganization is performed so that, at the time of the reorganization, different subgroups respectively include secondary system radio apparatus that have been included in the same subgroup in the previous detection. In other words, the subgroups are reorganized so that radio apparatuses grouped together in the past are divided and grouped into different subgroups.

Figure 19:
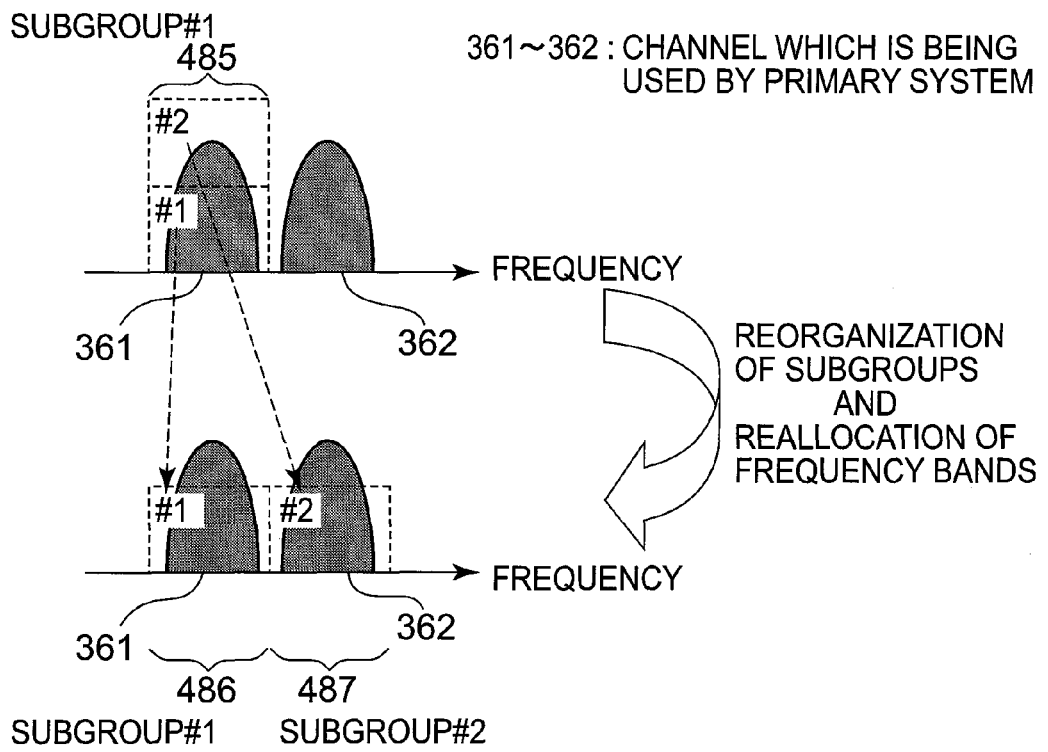
FIG. 19 is a diagram illustrating an example of reorganization of the subgroups and reallocation of the frequency bands according to a fourth embodiment of this invention.

FIG. 19 is a diagram illustrating an example of reorganization of the subgroups according to the fourth embodiment. This example shows only two secondary system radio apparatus (node #1 and node #2), and omits the other secondary system radio apparatus for the sake of the clearness of the description.

In the detection at the first stage illustrated in the upper part of FIG. 19, the node #1 and the node #2 are included in the same subgroup #1 (485). Therefore, in the detection at the second stage illustrated in the lower part of FIG. 19, in order to set the node #1 and the node #2 to be included in different subgroups, the subgroups are reorganized so that the node #1 is included in a new subgroup #1 (486) and the node #2 is included in a new subgroup #2 (487).

Next, description is given of an effect of the fourth embodiment. The effect of the fourth embodiment is improvement in reliability of the detection of the primary system. This effect is obtained owing to reduction in probability of forming a subgroup which is likely to determine that there is no primary system by constantly including, in the same subgroup, several secondary system radio apparatus having a low average SNR, which are included in the subgroup. In other words, a subgroup including secondary system radio apparatus having a low average SNR is prevented from incessantly influencing the detection of the primary system.

As described above, through collaboration of the plurality of cognitive radio apparatuses, this invention produces any one of the following effects or a combination thereof.

It is possible to perform detection resistant to the influences of the surrounding radio propagation environment, such as fading, shadowing, and distance attenuation.

In addition, it is possible to perform detection resistant to the influences from detection accuracy due to each individual secondary system radio apparatus, failure in detection, and the like.

Further, it is possible to allocate frequency bands so that more detection results obtained by different secondary system radio apparatus may be used for each frequency band in the detection at the next stage, by using the previous information on allocation of the frequency bands and the previous detection results thereof, which can alleviate the influences of the radio propagation.

Still further, it is possible to reduce the probability of a combination of secondary system radio apparatus having high possibility of failure in the detection of the primary system, by using the previous detection results.

In addition, it is possible to avoid a case where the detection results are incessantly influenced by the same frequency selective fading, by using the previous information on allocation of the frequency bands.

In other words, according to this invention, it is possible to provide the radio communication system capable of detecting another radio communication system with high efficiency.

It should be noted that for the method of allocating a plurality of subgroups exemplified above, using a method combining different methods simultaneously or combining different methods at a plurality of stages as appropriate enables detection of another radio communication system with higher efficiency.

It should also be noted that the section and various means of each radio apparatus may be implemented by hardware, or a combination of hardware and software. In the mode of the combination of hardware and software, a program is loaded in a RAM, and hardware such as the control section is operated according to the program, to thereby implement the components and various means. Further, the program may be recorded on a recording medium for distribution thereof. The program recorded on the recording medium is read into a memory by wire, by wireless, or via the recording medium itself, and causes the control section and other components to operate. It should be noted that examples of the recording medium include an optical disk, a magnetic disk, a semiconductor memory device, and a hard disk.

Further, the above-mentioned embodiments have been described with the control section of the radio communication system being installed in the master node, but the control section may be provided to any apparatus as long as communication may be performed with the slave node(s). For example, the control section may be provided to management equipment capable of radio communication with the radio communication system. Alternatively, the control section may be provided to a network server if the slave node is capable of wired communication. Still alternatively, the control section may communicate with some slave nodes by wireless, and by wire with some other slave nodes.

It should be noted that this invention is not limited to the embodiments and examples described above. The configuration and operation of this invention may be modified in various ways that may be understood by a person skilled in the art within the scope of the claims of this invention.

This invention is applicable to a radio communication system in which a frequency is shared with another radio communication system or between users in the system, and determination is made as to whether or not the frequency band is already being used by another system or another user or whether or not the use thereof is started. Further, this invention is similarly applicable to detection of the primary system at the start of communication as well as to detection of the primary system on a frequency band that is being used by the secondary system. Still further, this invention is also applicable to detection of another secondary system or other such system that is using the same frequency band as well as to detection of the primary system.

This application claims priority from Japanese Patent Application No. 2007-341376, filed on Dec. 28, 2007, and Japanese Patent Application No. 2008-105473, filed on Apr. 15, 2008 the entire disclosure of which is incorporated herein by reference.

The invention claimed is:

1. A radio communication system, which is a first radio communication system, comprising a plurality of cognitive radio apparatuses, wherein one of the cognitive radio apparatuses comprises:
  a transmission/reception section;
  a detection section configured for detecting a radio wave which is transmitted from a second radio communication system which is different from the first radio communication system and which is unable by the radio communication system;
  a control section configured for determining a frequency band on which each cognitive radio apparatus detects the radio wave and;
  a storage section configured to store frequency allocation information that shows which divided frequency band was allocated to each cognitive radio apparatus as a target band of detection in the past,
  wherein the control section comprises:
    a frequency band allocation section for assigning the following frequency bands on which the plurality of cognitive radio apparatuses of a radio apparatus group deal with the detection, with reference to the information on the frequency band on which each cognitive radio apparatus has dealt with the detection in the past and the detection result both of which are stored in the storage section;
    an examination section for examining whether or not the following frequency bands determined by the frequency band allocation section are available; and
    a subgroup division section configured for forming subgroups from the radio apparatus group with reference to the information on the frequency band on which each cognitive radio apparatus has dealt with the detection in the past and the detection results, which are recorded in the storage section, and
  the frequency band allocation section determines, for each subgroup, which frequency band is assigned to cognitive radio apparatuses of the subgroup to deal with the detection.

2. A radio communication system according to claim 1, wherein the control section is configured to divide the frequency band of the radio wave into a plurality of frequency bands and allocate the plurality of frequency bands with reference to the frequency allocation information stored in the storage section at a previous time.

3. A radio communication system according to claim 1, wherein the control section is configured to collect the detection results from the plurality of cognitive radio apparatuses within the radio apparatus group and judge status of usage of the plurality of frequency bands with reference to the frequency allocation information stored in the storage section.

4. A radio apparatus of a cognitive radio communication system, the cognitive radio communication system being a first radio communication system, comprising:
  a transmission/reception section;
  detection section configure for detecting a radio wave which is transmitted from a second radio communication system different from the first radio communication system;
  a transmission/reception section which is usable by the cognitive radio communication system;
  a control section configured for determining a frequency band on which each cognitive radio apparatus detects the radio wave signal; and
  a storage section configured to store frequency allocation information that shows which divided frequency band was allocated to each cognitive radio apparatus as a target band of detection in the past,
  wherein the control section comprises:
    a frequency band allocation section for assigning the following frequency bands on which the plurality of cognitive radio apparatuses of a radio apparatus group deal with the detection, with reference to the information on the frequency band on which each cognitive radio apparatus has dealt with the detection in the past and the detection result both of which are stored in the storage section;
    an examination section for examining whether or not the following frequency bands determined by the frequency band allocation section are available; and
    a subgroup division section configured for forming subgroups from the radio apparatus group with reference to the information on the frequency band on which each cognitive radio apparatus has dealt with the detection in the past and the detection results, which are recorded in the storage section, and
  the frequency band allocation section determines, for each subgroup, which frequency band is assigned to cognitive radio apparatuses of the subgroup to deal with the detection.

5. The radio apparatus according to claim 4, wherein the control section is configured to divide the radio wave frequency band wave into a plurality of frequency bands and allocate the frequency bands on the basis of the frequency allocation information stored at a previous time.

6. The radio apparatus according to claim 4, wherein the control section is configured to collect the detection results from other radio apparatuses within the radio apparatus group and judge status of usage of the frequency bands with reference to the frequency allocation information stored in the storage section.

7. The radio apparatus according to claim 4, wherein the subgroup division section is configured to divide the radio apparatus group of the radio apparatus into the subgroups for a next time so that a different divide frequency band from a target band of the previous detection is allocated to each radio apparatus for the detection of the next time.

8. The radio apparatus according to claim 4, wherein the subgroup division section is adapted to reorganize the subgroups for a next time so that the subgroups include at least one radio apparatus that detected another radio communication system in the past.

9. The radio apparatus according to claim 4, wherein the subgroup division section is adapted to reorganize the subgroups for a next time so as to enlarge frequency separation between a target divided frequency band of the next detection and a target divided frequency band of the previous detection.

10. A radio apparatus according to claim 4, wherein the subgroup division section is adapted to reorganize the subgroups for a next time so that the radio apparatuses which categorized into the same group in the past are grouped in to different subgroups.

* * * * *

UNITED STATES PATENT AND TRADEMARK OFFICE
CERTIFICATE OF CORRECTION

PATENT NO.       : 8,509,696 B2                                                                 Page 1 of 1
APPLICATION NO. : 12/810656
DATED            : August 13, 2013
INVENTOR(S)      : Muraoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 267 days.

Signed and Sealed this

Fifteenth Day of September, 2015

Michelle K. Lee
*Director of the United States Patent and Trademark Office*